United States Patent [19]

Baar et al.

[11] 3,964,382

[45] June 22, 1976

[54] ENGRAVING DEVICE FOR A PRINTING FORM ENGRAVING MACHINE

[75] Inventors: Walter Baar, Kiel; Herbert Koehler, Trappenkamp; Walter Muecke, Klausdorf, all of Germany

[73] Assignee: Dr. -Ing Rudolf Hell GmbH, Germany

[22] Filed: July 10, 1974

[21] Appl. No.: 487,283

[30] Foreign Application Priority Data

July 16, 1973 Germany............................ 2336089

[52] U.S. Cl. ................................ 101/1; 178/6.6 B; 324/125

[51] Int. Cl.² ........................................ G11B 3/18

[58] Field of Search ................ 101/1; 90/24.4, 24.5; 178/6.6 B; 74/5.5, 574; 82/11, 14 B; 324/125; 248/18; 188/268

[56] References Cited

UNITED STATES PATENTS

| | | | |
|---|---|---|---|
| 1,947,544 | 2/1934 | Bedford | 74/574 UX |
| 2,466,110 | 4/1949 | Julien | 188/268 X |
| 2,631,690 | 3/1953 | Dunham | 188/268 X |
| 3,006,627 | 10/1961 | Paulsen | 188/268 X |
| 3,334,886 | 8/1967 | Caunt | 74/574 X |
| 3,478,160 | 11/1969 | Reed | 188/268 X |
| R23,914 | 12/1954 | Boyajean | 178/6.6 B |

*Primary Examiner*—Anton O. Oechsle
*Attorney, Agent, or Firm*—Hill, Gross, Simpson, Van Santen, Steadman, Chiara & Simpson

[57] ABSTRACT

An engraving device having a rotary system including a shaft supported in a bearing for rotation through very small angles, means to oscillate the shaft, an engraving needle carried on a lever attached to one end of the shaft adjacent the bearing and a dampening device characterized by the dampening device being arranged between the bearing and lever and the dampening device applying symmetrical forces on the shaft so that the dampening forces do not create bending forces on the shaft. Preferably the dampening device is located closely adjacent to the lever. A preferred embodiment of the dampening device uses a stationary support having a surface surrounding the shaft and either a closed ring of fluoro-plastic dampening material which is connected to the shaft and surface or two or more fluoro-plastic elements which are circumferentially spaced between the shaft and the surface and connected thereto. In another embodiment of the dampening device either an annular ring is attached to the shaft and is received in an annular container of grease or a pair of circumferentially spaced wings are attached to the shaft and extend in to symmetrically arranged containers of grease.

12 Claims, 6 Drawing Figures

ENGRAVING DEVICE FOR A PRINTING FORM ENGRAVING MACHINE

BACKGROUND OF THE DISCLOSURE

The present invention is directed to a recording device, particularly an engraving device for a printing form engraving machine utilized to engrave printing plates or cylinders. The device comprises a shaft that is oscillated through a very small rotary angle, an engraving needle carried on a lever attached to one end of the shaft and a dampening arrangement connected to the shaft.

In a printing form engraving machine for engraving a printing plate or printing cylinders with a pattern to be printed which pattern may be writings, half-tone pictures or combinations of both, the pattern is scanned by a dot-like light in a line-by-line sequence. The light, which is reflected by the pattern, is measured for the intensity of the reflected light, which depends on the density of the scanned portion of the pattern, and is transformed into electrical picture signals. The picture signals are superimposed with a raster signal of a constant frequency for the raster pattern which is to be formed on the surface of the printing plate or cylinder.

The recording device of the printing form engraving machine utilizes an engraving system or device which is controlled by the combination picture and raster signal to actuate an engraving needle as a cutting tool. The raster signal causes a continuously vibrating lift movement of the engraving needle to form or cut a succession of depressions which are referred to as cups or cells on the surface of the printing form. The cups formed on the printing plate or cylinder will be in a raster pattern. The picture signal, which is an indication of the measured density of each particular portion of the pattern being reproduced, will determine the cutting depth of the engraving needle while forming each cup. Thus, during scanning of the pattern, a black part has a large density and will produce a picture signal that will cause the engraving needle to cut a deep cup. However, a white portion of the pattern will have little density and result in a picture signal which will control the engraving needle to produce a shallow cup.

In utilizing the engraved printing form during the printing process, each cup will contain a volume, which is proportional to the depth of the cup of printing ink, which may be a colored ink. The excess ink is wiped from the surface of the form by a doctor blade. The ink contained in the cup of the printing form is transferred from the cups onto the web on which the printing is to appear. The tone value of the printed surface at each point of the printed image is determined by the volume of ink carried by the cup at each point in the raster pattern.

During the engraving of each of the printing forms, the position of each of the cups with respect to other cups and their shape and depth have to be closely observed. Deviations in the arrangement of the cups with respect to other cups will lead to moire patterns and to color shift if several different colored inks are used.

In the printing process, there are approximately 120 tone value stages to distinguish between the density of "black" and "white" of the pattern. During the engraving, the needle lift difference for one tone value stage to the next adjacent tone value stage is approximately 0.25 $\mu$m. Any deviation in needle lift changes the depth of the respective cup and thus the printed tone value.

Imperfections of the above type are sensed by the human eye as being disturbing when observing the printed picture. The above described requirements make great demands in respect to an engraving system or device which will be described in more detail in the following paragraphs.

The engraving device consists of a stationary electromagnet having an air gap which receives an armature mounted on a shaft of a rotary system. The coil of the electromagnet is energized by a control current which is proportional to the picture signal and raster signal. The rotary system also includes a bearing for supporting the shaft for rotation and dampening means. One end of the shaft is changed into a torsion rod which is spatially mounted from the other end which carries a lever on which the engraving needle is attached.

The magnetic field of the electromagnet electrically rotates the armature and the shaft, from a fixed resting position and the torsion rod assembly opposes the rotation by the electromagnet and applies a force restoring the shaft to the resting position. During each cup engraving step, the shaft is rotated through a very small rotary angle from the resting position which is determined by the non-twisted torsion rod and the angle of rotation is proportional to the amount or intensity of the control current which is determined by the picture signal and the raster signal.

Since the torsion rod assembly creates a spring-mass-system in case of abrupt changes of the control current, rotary inertia and additional attenuation due to dynamic moments will occur. The transit response of the engraving needle is determined by the degree of attenuation at its desired level which is determined by the control current.

In order to give the rotary system a desired degree of attenuation, a dampening arrangement is provided.

It is known from measuring techniques to dampen rotary systems by utilizing wings or pistons which move in a closed-off chamber containing a dampening medium. These arrangements have a common fact that the surface of the wings or the pistons which are effective for dampening are arranged perpendicular to the direction of movement of the rotary system. The known dampening arrangements cannot be used in the above engraving system since the degree of dampening which can be achieved thereby is insufficient due to the very small rotary angle of the shaft. Furthermore, it has been established that the characteristics of the dampening medium change due to mechanical stresses to the bordering surfaces of the dampening wings. This is due to the shaft and the dampening wings oscillating at a high frequency in the dampening medium.

After many years of preliminary work on solving the dampening problem, a dampening arrangement was developed for the engraving system or device wherein a single dampening wing, which is designed with a large surface area, was connected to the shaft at a point spaced from the lever and submerged into a stationary chamber which is filled with grease as a dampening medium. Unlike the known embodiments, the broad sides or surfaces of the dampening wing extend normal to the shaft and in the direction of rotation of the shaft. The degree of dampening of this proposed arrangement depends largely on the characteristics of the grease.

Even though the grease dampening device initially fulfills its task, after long periods of time, such as several years of practice, considerable shortcomings in respect to a mass production and maintenance of the engraving systems have become obvious. For example, the production of grease, as a dampening medium, with reproducible characteristics has not been achieved. Since the dampening characteristics of the grease change due to the influence of temperature and due to aging, the oscillation amplitude of the engraving needle would become unstable. Mistakes resulting from these defects will occur in the engraving operation and particularly during the scanning of patterns with large density differences at the transit points between dark and light portions in the pattern. These mistakes become disturbingly visible at these transit points when the entire pattern is observed.

If the engraving device has insufficient dampening, several contours may occur in the picture at the transit points from dark to light portions of the pattern. However, in the case of excessive dampening of the engraving device, the tone value determined by the pattern is produced in the picture with delay.

A further disadvantage of the described dampening arrangement is that the frictional forces between the dampening wing and the dampening medium are applied on one side of the shaft. This results in a bending moment, which fluctuates with the frequency of the oscillating system, and which moment tends to induce undesirable bending oscillations to the shaft. Since the resonant frequency of the bending oscillations is located in the proximity of the operating frequency of the oscillating system, surges will occur.

The deflection of the shaft with a surge frequency due to the bending oscillations has two main directions. One direction is in the direction of the lift movement of the engraving needle and superimposes the effective lift. This direction of bending oscillation in the case of large differences in density in the pattern causes several contours to appear in the finished picture. The second direction of deflection is perpendicular to the lift movement of the needle. Another deflection, perpendicular to the lift movement of the needle is achieved by forces applied to the lever during the insertion of the engraving needle into the material of the rotating printing form. The direction of deflection perpendicular to the lift movement of the engraving needle leads to the cutting of distorted cups which in the finally printed picture results in incorrect tone values. It has also been shown that the described dampening arrangements can lead to imperfections during the engraving of printing forms which can only be corrected by the production of a new form involving additional cost and time.

SUMMARY OF THE INVENTION

The present invention is directed to the task of eliminating the above mentioned drawbacks in an engraving device for a machine to engrave printing forms which device comprises a shaft having a lever supporting an engraving needle or tool, bearing means adjacent the lever for supporting the shaft for rotary movement, means for oscillating the shaft through very small rotary angles and means acting upon the shaft for dampening rotational movement thereof. The task is solved by the dampening means being connected to the shaft between the bearing means and the lever and by the dampening means applying the dampening forces symmetrically to the shaft so that the dampening forces are applied without creating any bending forces on the shaft.

In one embodiment of the invention, the dampening means comprise a stationary support having at least one surface radially spaced from at least two circumferentially spaced points on an outer surface of the shaft and at least one dampening element of an elastically deformable homogeneous solid state dampening material extending between said points of the outer surface and the surface at the support and being in engagement therewith. Preferably the surface of the support surrounds the shaft and the element may be either at least one closed ring or at least two blocks or arcuate segments of a ring. The engagement between the surfaces and the element may be either an adhesive connection or a pressed fit which may be adjustable by providing an adjustable stationary support that can vary the radial distance of its surface from the shaft to vary the pressure of the press fit to change the dampening characteristics of the element or elements.

Another embodiment of the dampening means comprises at least one dampening element attached to the shaft and the element has major planar surfaces extending normal to the axis of rotation and in the direction of rotation of the shaft and from at least two circumferentially spaced points on a circumferential line on the outer surface of the shaft into at least one container of dampening material, such as grease. The element may be a circular member and the container an annular container surrounding the shaft or the element may be two or more circumferentially spaced wing blades with each blade extending into a separate container.

In both embodiments the dampening means is preferably located closely adjacent to the lever.

DESCRIPTION OF THE PREFERRED EMBODIMENTS

Figure 1:
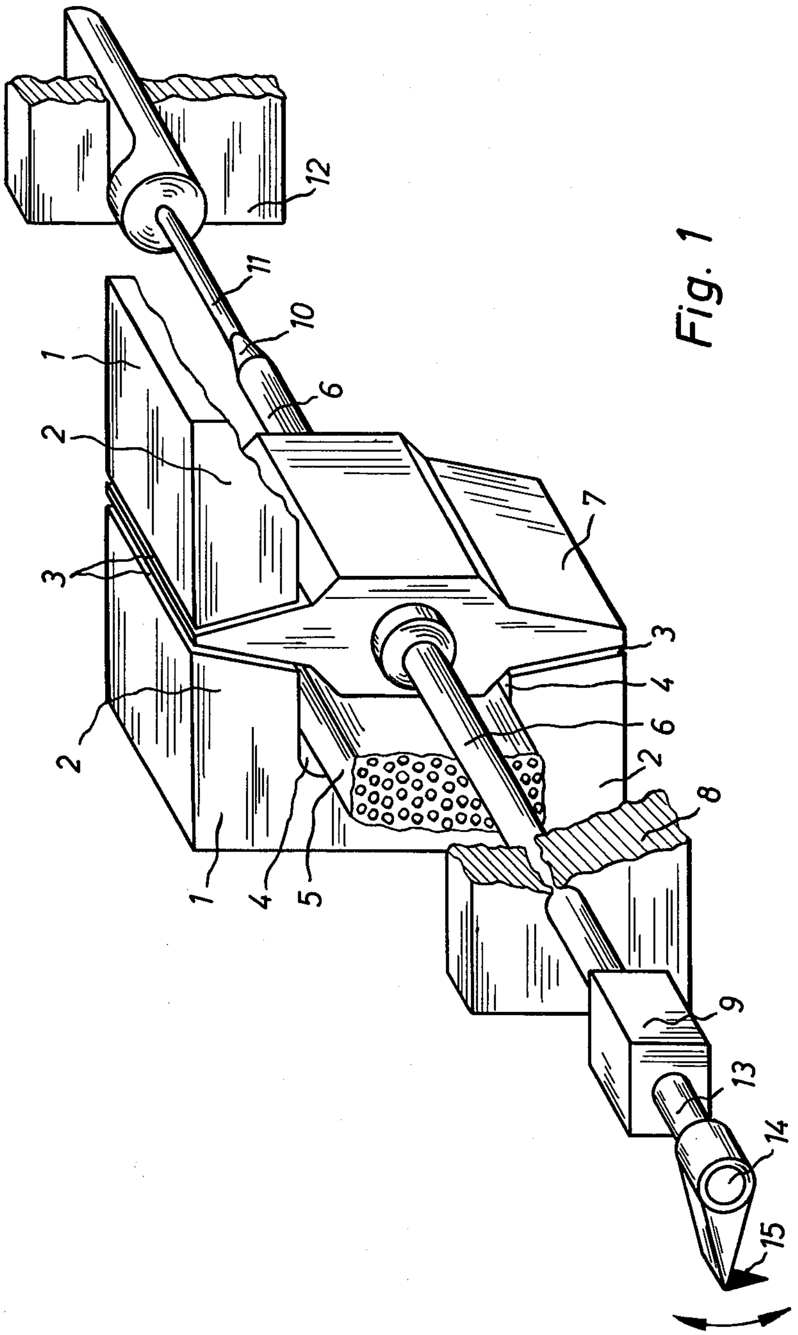
FIG. 1 is a perspective view with portions broken away for purpose of illustration of an engraving device for a printing form engraving machine according to the present invention.

The principles of the present invention are particularly useful in an engraving device illustrated in FIG. 1 for a printing form engraving machine. The engraving device utilizes a stationary electromagnet and rotary system. The electromagnet comprises a pair of U-shaped sheet metal packages 1 each of which has a pair of legs 2 surrounding a recess 4. The sheet metal packages 1 are arranged in a facing mirror relationship with the legs 2 of each package being spaced apart to form a pair of air gaps 3. In the recess 4 of each package 1, a coil 5 is positioned and is connected by means not shown to a control current. The intensity fluctuations in the control current are controlled by the superimposed picture and raster signals discussed hereinabove.

The rotary system comprises a shaft 6 supporting an armature 7 which is positioned between the packages 1 in the air gaps 3. A bearing 8 supports the shaft 6 and its armature for rotation and is positioned adjacent one end which is provided with dampening means 9 which is not illustrated in detail in FIG. 1. Opposite the bearing 8, an end 10 of the shaft 6 changes into a torsion rod 11 which is connected in a recess of the frame member 12. A portion 13 of the shaft 6 which extend from the dampening means 9 carries a lever 14 which rotates with the shaft. The lever 14 has attached thereto an engraving tool or needle 15.

Figure 2:
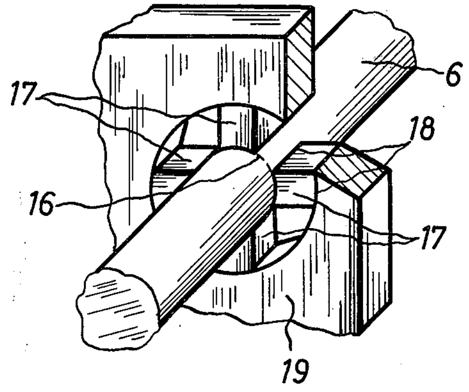
FIGS. 2–4 are perspective views with portions broken away for purpose of illustration of three different forms of an embodiment of the dampening device of the present invention.
Figure 3:
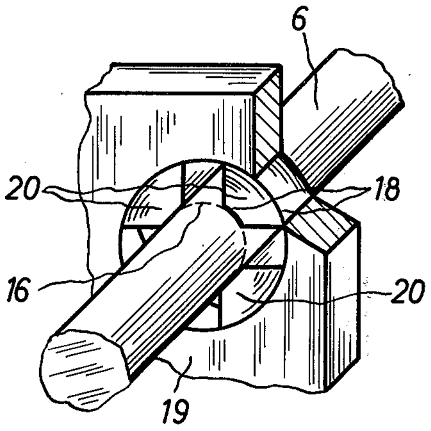
Figure 4:
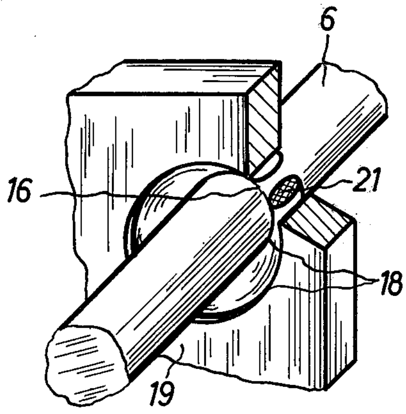

The embodiment of the dampening means which is illustrated in FIGS. 2, 3 and 4 may take three different forms and like parts are identified by the same element member.

In FIG. 2, the dampening means include a housing 19 having an annular surface which surrounds the outer surface of the shaft 6. Disposed between the annular surface of the support 19 and a circumferential line 16 on the outer surface of the shaft 6 are a plurality of homogeneous solid state members 17 or elements which have a block or square shape and which are preferably formed of a plastic material such as a fluoro-plastic. The members 17 are circumferentially spaced along the line 16 and have radially opposite end surfaces 18 engaging the annular surface of the support 19 and outer surface of the shaft 6. To ensure a tight engagement, the members 17 may be pressed into the space between the entire surface of the shaft and the annular surface of the support 19 to form a pressed fit or the members 17 may be attached to both the shaft 6 and the annular surface of the support 19 by an appropriate adhesive.

The second form of the first embodiment of the present invention is illustrated in FIG. 3. As in the previous form of the first embodiment, a support 19 having an annular surface surrounding a circumferential line 16 of the shaft 6 is connected to the shaft by a plurality of circumferentially spaced solid elements or members 20 which are of a homogeneous solid material such as a fluoro-plastic. The members 20, which may either be press fit into tight engagement to form the connection or adhesively attached to the surfaces, have a shape of an arcuate segment of a ring which has a rectangular cross section.

The third form of the first embodiment of the dampening means is illustrated in FIG. 4. The annular surface of the support 19 surrounds the circumferential lines 16 of the shaft 6. The dampening element or member comprises a single closed ring 21 of elastically deformable material such as a fluoro-plastic which ring may be either press fit into tight engagement to form a connection between the element and the surface of the shaft 6 and support 19 or adhesively attached thereto.

In each of the above three forms of the first embodiment of the dampening means 9, the stationary support 19 may be constructed as an adjustable support so that the diameter of its annular surface may be contracted or expanded. With this feature, the dampening characteristic of the elements or members 17, 20 or 21 may be varied by varying the radial distance between the outer surface of the shaft 6 and the annular surface of the support 19. This is particularly useful when the elements or members use a press fit to form the engagement or connection with the surfaces of the shaft and support.

By using a solid member of a soft-elastic plastic such as a fluoro-plastic, excellent dampening characteristic will be achieved. The degree of dampening is temperature stable and shows a scatter free value which remains constant over long periods. Thus the engraving device achieves a great reliability. Furthermore the plastic elements provide excellent dampening of rotary oscillations.

Due to the axial symmetrical arrangement of the dampening elements and due to the additional guiding or supporting of the shaft in the proximity of the lever in spite of the forces acting on the lever during the engraving operations, the bending oscillations do not occur. Thus the rotary system achieves a high stability.

By use of one or more rings, the dampening means may be assembled very easily due to the fact that the individual dampening elements do not require exact positioning in the device.

Figure 5:
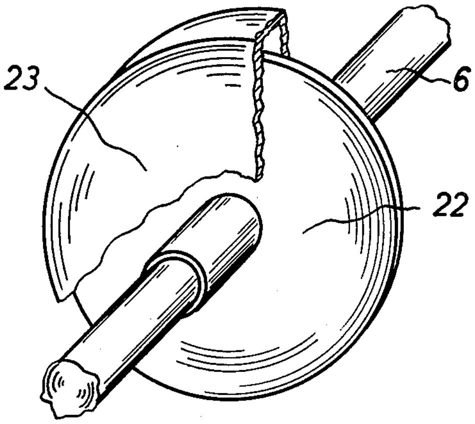
FIGS. 5 and 6 are perspective views with portions broken away for purpose of illustration of two different forms of a second embodiment of the dampening device of the present invention.
Figure 6:
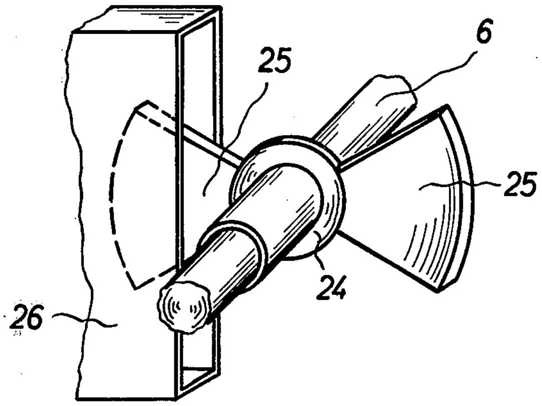

In FIGS. 5 and 6, two forms of a second embodiment of the dampening means 9 are illustrated. This embodiment is particularly useful for preventing the application of bending forces to the shaft by the dampening means.

In FIG. 5, the embodiment includes a circular disk or member 22 which is attached on the shaft 6. The disk 22 is received in an annular stationary chamber 23 which surrounds the shaft and is filled with a dampening medium which is preferably grease.

Another form of the second embodiment is illustrated in FIG. 6 and includes a wing 24 which is connected to the shaft 6 and is provided with a pair of symmetrical wing blades 25. Each of the wing blades 25 is submerged into a stationary chamber 26 (only one chamber illustrated) which chambers are filled with the dampening medium such as grease. The broadside or planar surfaces of each of the blades 25 extend normal to the axis of the shaft 6 and parallel to the direction of rotation of the shaft during the engraving oscillation for the engraving process.

Although various minor modifications may be suggested by those versed in the art, it should be understood that we wish to include within the scope of the patent granted hereon all such modifications as reasonably and properly come within the scope of our contribution to the art.

We claim:

1. In an engraving device for a machine to engrave printing forms, said device comprising a shaft having an end supporting a lever supporting an engraving needle, bearing means adjacent the lever for supporting the shaft for rotary movement with the end extending therefrom, means for oscillating the shaft through very small rotary angles and means acting upon the shaft for dampening rotational movement thereof, the improvement comprising said dampening means being connected to said shaft between said bearing means and said lever and closely adjacent to said lever, and said dampening means applying the dampening force symmetrically to the shaft so that the dampening forces are applied to the shaft to dampen both torsional and bending forces applied to the end of the shaft.

2. In an engraving device according to claim 1, wherein said dampening means includes a stationary support having at least one surface radially spaced from at least two circumferentially spaced points on an outer surface of the shaft and at least one dampening element of an elastically deformable solid state dampening material extending between said points of the outer surface of the shaft and the surface of the support and being in engagement therewith.

3. In an engraving device according to claim 1, wherein said dampening means comprises a stationary support with an annular surface surrounding a circumferential surface of the shaft and at least one closed ring engaging the surfaces of the shaft and the stationary support, the ring being of an elastically deformable solid state material.

4. In an engraving device according to claim 2, wherein the surface of the stationary support surrounds the shaft and wherein the dampening element comprises at least two block members circumferentially spaced about a circumferential line on the surface of the shaft.

5. In an engraving device according to claim 2, wherein the surface of the stationary support surrounds the shaft and wherein the dampening element comprises at least two arcuate segments of a ring circumferentially spaced about a circumferential line on the surface of the shaft.

6. In an engraving device according to claim 2, wherein the engagement between the element and the surfaces of the shaft and support is a press fit.

7. In an engraving device according to claim 2, wherein the engagement of the element to the surface of shaft and the surface of the support is formed by an adhesive connection.

8. In an engraving device according to claim 1, wherein the dampening means includes at least one dampening element attached to the shaft, said element having major planar surfaces extending normal to the axis of rotation and in the direction of rotation of the shaft and from at least two circumferentially spaced points on a circumferential line on the outer surface of the shaft into at least one container of dampening medium radially spaced from said points.

9. In an engraving device according to claim 8, wherein said dampening element is a circular member, and wherein said container is an annular container surrounding said shaft.

10. In an engraving device according to claim 8, wherein said dampening element comprises at least two circumferentially spaced wing blades with each blade extending into a separate container.

11. In an engraving device according to claim 8, wherein the dampening medium is grease.

12. In an engraving device according to claim 3, wherein the degree of dampening of said dampening means is adjustable by selecting the difference between the inside diameter of said annular surface and the diameter of the shaft.

* * * * *